(12) United States Patent
VanBlon et al.

(10) Patent No.: US 11,606,698 B2
(45) Date of Patent: Mar. 14, 2023

(54) DYNAMICALLY SHARING WIRELESS SIGNATURE DATA

(71) Applicant: LENOVO (Singapore) PTE. LTD., New Tech Park (SG)

(72) Inventors: Russell Speight VanBlon, Raleigh, NC (US); John Carl Mese, Cary, NC (US); Nathan J. Peterson, Oxford, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 203 days.

(21) Appl. No.: 16/689,875

(22) Filed: Nov. 20, 2019

(65) Prior Publication Data

US 2021/0153008 A1 May 20, 2021

(51) Int. Cl.
*H04W 84/18* (2009.01)
*H04W 12/06* (2021.01)
*H04W 12/80* (2021.01)
*H04L 9/32* (2006.01)

(52) U.S. Cl.
CPC ........... *H04W 12/80* (2021.01); *H04L 9/3247* (2013.01); *H04W 12/06* (2013.01)

(58) Field of Classification Search
CPC ...... H04W 12/80; H04W 12/06; H04L 9/3247
See application file for complete search history.

(56) References Cited

U.S. PATENT DOCUMENTS

2015/0295901 A1* 10/2015 Woodward ............ H04W 12/08 713/168
2016/0041879 A1* 2/2016 Varadarajan ............ H04L 67/06 707/653
2018/0165935 A1* 6/2018 VanBlon ................ H04L 67/52
2019/0182627 A1* 6/2019 Thoresen ............... H04W 4/022

FOREIGN PATENT DOCUMENTS

WO    WO-2017106976 A1 *  6/2017 ............. G06N 20/00

OTHER PUBLICATIONS

Song Fang; Yao Liu; Peng Ning; Mimicry Attacks Against Wireless Link Signature and New Defense Using Time-Synched Link Signature; IEEE Transactions on Information Forensics and Security; Year: Jul. 2016; vol. 11; Issue 7; Journal Article; Publisher: IEEE; pp. 1515-1527 (Year: 2016).*

* cited by examiner

*Primary Examiner* — Kendall Dolly
*Assistant Examiner* — Courtney D Fields
(74) *Attorney, Agent, or Firm* — Kunzler Bean & Adamson

(57) ABSTRACT

Apparatuses, methods, systems, and program products are disclosed for dynamically sharing wireless signature data. An apparatus includes a processor and a memory that stores code executable by the processor. The code is executable by the processor to detect a wireless signature emitted from an information handling device at a network-connected device and record wireless signature information for the information handling device based on the wireless signature. The code is executable by the processor to receive a request to share the wireless signature information with a requesting party. The code is executable by the processor to share the wireless signature information with the requesting party from the network-connected device in response to determining that the requesting party is an authorized party for receiving the wireless signature information.

20 Claims, 6 Drawing Sheets

DYNAMICALLY SHARING WIRELESS SIGNATURE DATA

FIELD

The subject matter disclosed herein relates to data sharing and more particularly relates to dynamically sharing wireless signature data.

BACKGROUND

Devices may emit wireless information in the wireless data packets that emanate from the device. Various devices may capture this information such as "Internet of Things" devices. However, the "Internet of Things" devices may not be capable of sharing wireless signature data with other devices.

BRIEF SUMMARY

Apparatuses, methods, systems, and program products are disclosed for dynamically sharing wireless signature data. An apparatus, in one embodiment, includes a processor and a memory that stores code executable by the processor. In certain embodiments, the code is executable by the processor to detect a wireless signature emitted from an information handling device at a network-connected device and record wireless signature information for the information handling device based on the wireless signature. In some embodiments, the code is executable by the processor to receive a request to share the wireless signature information with a requesting party. In various embodiments, the code is executable by the processor to share the wireless signature information with the requesting party from the network-connected device in response to determining that the requesting party is an authorized party for receiving the wireless signature information.

A method for dynamically sharing wireless signature data, in one embodiment, includes detecting, by a processor, a wireless signature emitted from an information handling device at a network-connected device and recording wireless signature information for the information handling device based on the wireless signature. The method, in one embodiment, includes receiving a request to share the wireless signature information with a requesting party. In further embodiments, the method includes sharing the wireless signature information with the requesting party from the network-connected device in response to determining that the requesting party is an authorized party for receiving the wireless signature information.

A computer program product for dynamically sharing wireless signature data, in one embodiment, includes a computer readable storage medium having program instructions embodied therewith. In certain embodiments, the program instructions are executable by a processor to cause the processor to detect a wireless signature emitted from an information handling device at a network-connected device and record wireless signature information for the information handling device based on the wireless signature. In further embodiments, the program instructions are executable by a processor to cause the processor to receive a request to share the wireless signature information with a requesting party. In one embodiment, the program instructions are executable by a processor to share the wireless signature information with the requesting party from the network-connected device in response to determining that the requesting party is an authorized party for receiving the wireless signature information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
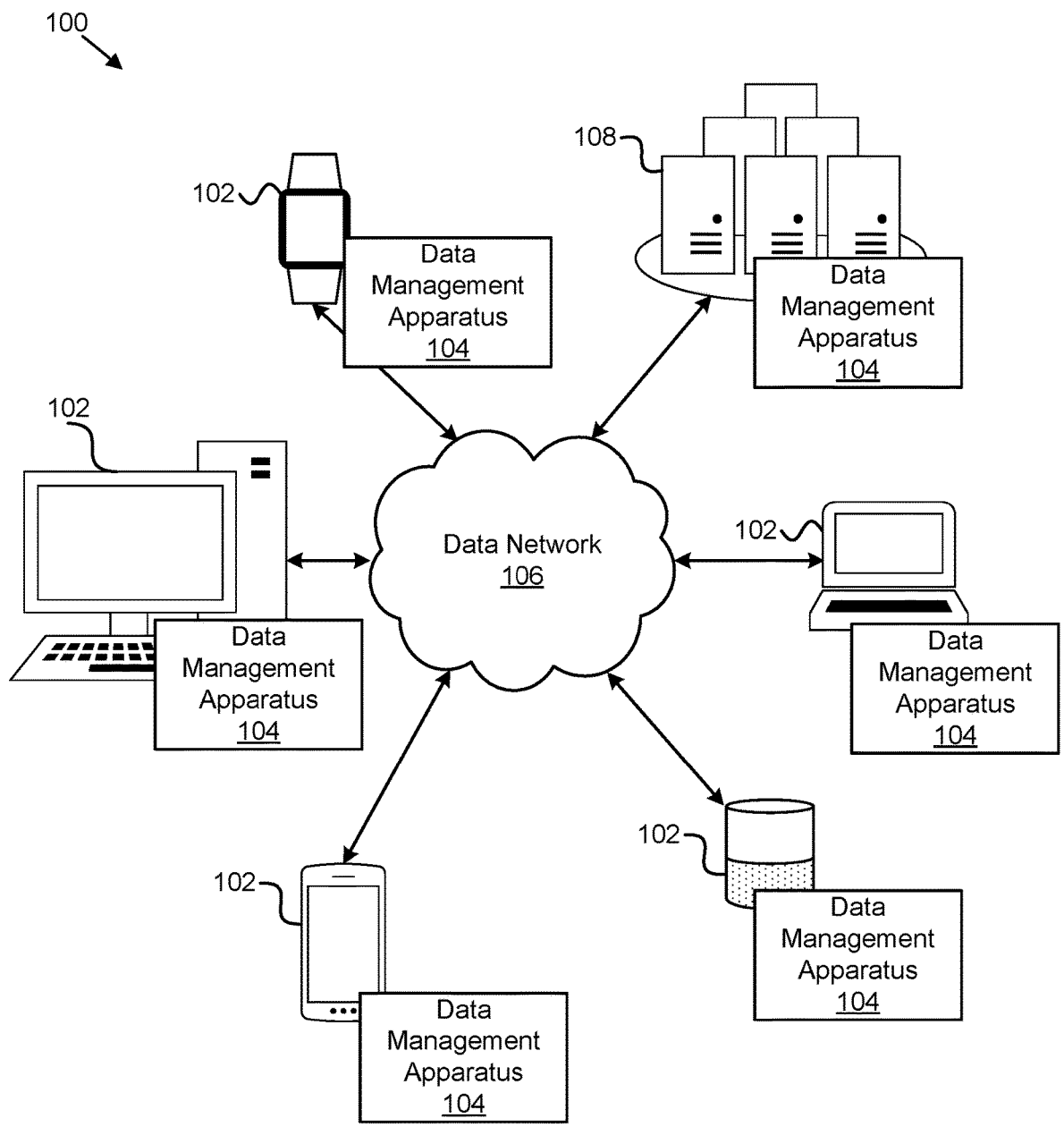
FIG. 1 is a schematic block diagram illustrating one embodiment of a system for dynamically sharing wireless signature data.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus, in one embodiment, includes a processor and a memory that stores code executable by the processor. In certain embodiments, the code is executable by the processor to detect a wireless signature emitted from an information handling device at a network-connected device and record wireless signature information for the information handling device based on the wireless signature. In some embodiments, the code is executable by the processor to receive a request to share the wireless signature information with a requesting party. In various embodiments, the code is executable by the processor to share the wireless signature information with the requesting party from the network-connected device in response to determining that the requesting party is an authorized party for receiving the wireless signature information.

In one embodiment, the code is executable by the processor to detect illegal activity within a predetermined proximity of the network-connected device and automatically share wireless signature information for one or more wireless signatures that are detected within a timeframe of the detected criminal activity with a first responder system.

In further embodiments, the illegal activity is detected based on information received at a first security system from one or more second security systems communicatively coupled to the first security system over a data network. In some embodiments, the code is executable by the processor to share wireless signature information with one or more neighboring devices for one or more wireless signatures that are unknown to the sender and the one or more neighboring devices.

In one embodiment, the code is executable by the processor to prevent sharing wireless signature information for one or more known wireless signatures. In further embodiments, the request includes a query for a specific wireless signature, the wireless signature information being shared with the requesting party in response to wireless signature information being recorded for the specific wireless signature.

In certain embodiments, the request includes a timeframe such that wireless signature information for one or more wireless signatures that are detected within the timeframe are shared with the requesting party. In one embodiment, the request includes a reason for requesting the wireless signature information and the code further executable by the processor to process the reason and determine whether the reason satisfies a predetermined reason for sharing the wireless signature information.

In one embodiment, the recorded wireless signature information for each detected wireless signature comprises permissions that define parameters for sharing the wireless signature information. In some embodiments, the wireless signature information comprises one or more of a device identifier for the information handling device emitting the wireless signature, a user identifier for the device, a signal strength of the detected wireless signal, and a location of the detected wireless signal.

In one embodiment, the code is executable by the processor to prompt a user associated with the network-connected device for confirmation to share the wireless signature information. In further embodiments, the code is executable by the processor to notify a user associated with the network-connected device that wireless signature information has been shared with one or more other devices. In one embodiment, the notification comprises one or more of an indication of the wireless signature information that was shared, an identifier for each device that the wireless signature information was shared with, and a reason for sharing the wireless signature information.

A method for dynamically sharing wireless signature data, in one embodiment, includes detecting, by a processor, a wireless signature emitted from an information handling device at a network-connected device and recording wireless signature information for the information handling device based on the wireless signature. The method, in one embodiment, includes receiving a request to share the wireless signature information with a requesting party. In further embodiments, the method includes sharing the wireless signature information with the requesting party from the network-connected device in response to determining that the requesting party is an authorized party for receiving the wireless signature information.

In one embodiment, the method includes detecting illegal activity within a predetermined proximity of the network-connected device and automatically sharing wireless signature information for one or more wireless signatures that are detected within a timeframe of the detected criminal activity with a first responder system. In some embodiments, the method includes sharing wireless signature information with one or more neighboring devices for one or more wireless signatures that are unknown to the sender and the one or more neighboring devices.

In one embodiment, the request includes a query for a specific wireless signature, the wireless signature information being shared with the requesting party in response to wireless signature information being recorded for the specific wireless signature. In some embodiments, the method includes prompting a user associated with the network-connected device for confirmation to share the wireless signature information. In various embodiments, the method includes notifying a user associated with the network-connected device that wireless signature information has been shared with one or more other devices.

A computer program product for dynamically sharing wireless signature data, in one embodiment, includes a computer readable storage medium having program instructions embodied therewith. In certain embodiments, the program instructions are executable by a processor to cause the processor to detect a wireless signature emitted from an information handling device at a network-connected device and record wireless signature information for the information handling device based on the wireless signature. In further embodiments, the program instructions are executable by a processor to cause the processor to receive a request to share the wireless signature information with a requesting party. In one embodiment, the program instructions are executable by a processor to share the wireless signature information with the requesting party from the network-connected device in response to determining that the requesting party is an authorized party for receiving the wireless signature information.

FIG. 1 is a schematic block diagram illustrating one embodiment of a system 100 for dynamically sharing wireless signature data. In one embodiment, the system 100 includes one or more information handling devices 102, one or more data management apparatuses 104, one or more data networks 106, and one or more servers 108. In certain embodiments, even though a specific number of information handling devices 102, data management apparatuses 104, data networks 106, and servers 108 are depicted in FIG. 1, one of skill in the art will recognize, in light of this disclosure, that any number of information handling devices 102, data management apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In one embodiment, the data management apparatus 104 is configured to detect a wireless signature emitted from an information handling device 102 at a network-connected device, e.g., a router, switch, or other "Internet of Things" enabled device, record wireless signature information for the information handling device based on the wireless signature, receive a request to share the wireless signature information with a requesting party, and share the wireless signature information with the requesting party from the network-connected device in response to determining that the requesting party is an authorized party for receiving the wireless signature information. The data management apparatus 104, including its various sub-modules, may be located on one or more information handling devices 102 in the system 100, one or more servers 108, one or more network devices, and/or the like. The data management apparatus 104 is described in more detail below with reference to FIGS. 2 and 3.

In various embodiments, the data management apparatus 104 may be embodied as a hardware appliance that can be installed or deployed on an information handling device 102, on a server 108, on a user's mobile device, on a display, or elsewhere on the data network 106. In certain embodiments, the data management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the data management apparatus 104 may include a power interface, a wired and/or wireless network interface, a graphical interface that attaches to a display, and/or a semiconductor integrated circuit device as described below, configured to perform the functions described herein with regard to the data management apparatus 104.

The data management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the data management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the data management apparatus 104.

The semiconductor integrated circuit device or other hardware appliance of the data management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the data management apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The servers 108 may be third-party servers managed, hosted, maintained, or the like by a public or private first responder system such as EMTs, ambulances, paramedics, firefighters, police, private security companies, private investigators, and/or other security and first responder systems.

Figure 2:
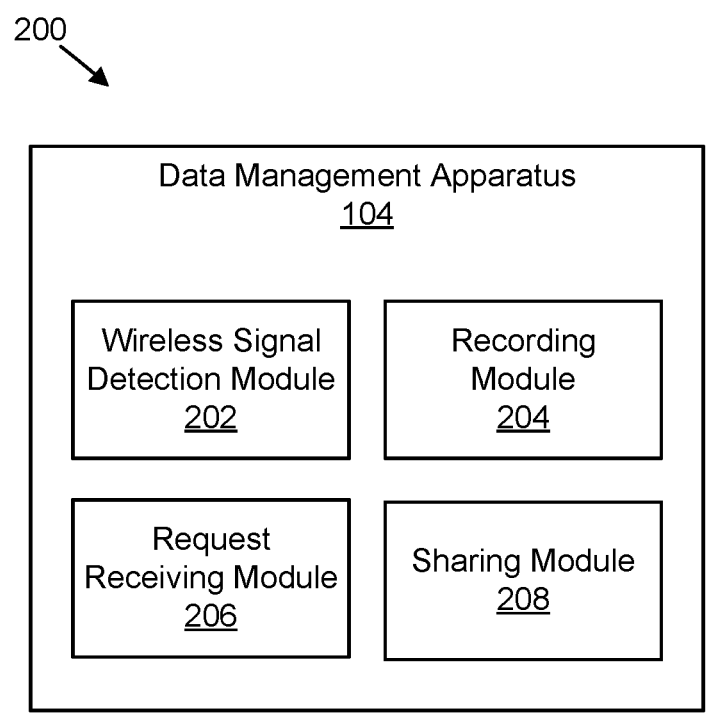
FIG. 2 is a schematic block diagram illustrating one embodiment of an apparatus for dynamically sharing wireless signature data.

FIG. 2 is a schematic block diagram illustrating one embodiment of an apparatus 200 or dynamically sharing wireless signature data. In one embodiment, the apparatus 200 includes an instance of a data management apparatus 104. In one embodiment, the data management apparatus 104 includes one or more of a wireless signal detection module 202, a recording module 204, a request receiving module 206, and a sharing module 208, which are described in more detail below.

In one embodiment, the wireless signal detection module 202 is configured to detect, at a network-connected device, a wireless signature or signal that is emitted from an information handling device 102. The network-connected device may be a network hardware device such as a switch, a router, a wireless access point, a bridge, a modem, a network interface card, and/or the like. In further embodiments, the network-connected device may be a consumer device that is configured to connect to a data network such as an "Internet of Things" ("IoT") device. An IoT device, as used herein, is a device, object, item, person, animal, or the like that can connect with other devices over a data network such as an intranet, a LAN, a WAN, the Internet, and/or the like. Examples may include network-enabled appliances, televisions, smart phones, smart watches, security systems, surveillance cameras, set-top boxes, thermostats, sprinkler-system controllers, smart lights, smart outlets, garage door openers, smart doorbells, and/or the like.

In one embodiment, the wireless signal detection module 202 may detect when a device is within a proximity of a network-connected device. A device may be within a proximity of a network-connected device when the network-connected device can detect a wireless signals emitted, send, transmitted, or the like from the device using a wireless signal sensor, when the network-connected device can "see" the device using a camera or other image sensor, when the network-connected device can sense the device using proximity sensors, motion sensors, and/or the like. For instance, the wireless signal detection module 202 may detect when a smart phone is within a proximity of the network-connected device in response to detecting wireless signals emitted from the smart phone such as Bluetooth® signals, cellular signals, near-field communication signals, infrared signals, Wi-fi signals, and/or the like.

In one embodiment, the recording module 204 is configured to record wireless signature information for the detected device based on the wireless signature that is detected from the detected device. A wireless signal may include data packets that comprise information describing the wireless signature for a device. For instance, the wireless signature information may include an identifier for the device (e.g., a media access control ("MAC") address, an internet protocol ("IP") address, a serial number, or the like), an identifier for the wireless interface/network card for the device (e.g., a serial number), the device's location, the network(s) the device is connected to, the strength of the wireless signal, and/or other identifying information for the device. The wireless signature information may further include personally identifiable information ("PII") for the device user or owner such as the user's username, the user's real name, the user's contact information, and/or the like.

In one embodiment, the recording module 204 stores the wireless signature information in a data store such as a data repository in the cloud or in another remote location, a data store maintained locally on the network-connected device or on a local network, and/or the like. The wireless signature data, for instance, may be stored in an indexable database for efficient accessing, searching, and storing. The recording module 204 may store all the wireless signature information that it detects or receives, including PII for the device user or may only store a subset of the information such as the identifier for the detected device, a timestamp of when the device was detected, the time frame or range (e.g., the start and end time) of when the device was detected, and/or the like without storing the user's PII.

In one embodiment, the recording module 204 assigns permissions to each of the wireless signature information that is recorded. The permissions may define parameters for sharing the wireless signature data such as who or what device can access/read/write/edit the wireless signature data, or the like. For instance, when the recording module 204 records wireless signature information for a device, the recording module 204 may use default permissions for the wireless signature information, which may state that the wireless signature data cannot be shared unless authorized to be shared by an authorized party, e.g., a user who owns or maintains the network-connected device.

The recording module 204 may set permissions for each wireless signature information that is stored based on input from a user. For instance, a user may specify that new wireless signature information be stored with the default permissions, that wireless signature data may be accessed by first responders, or may set specific users or devices that can or cannot access certain wireless signature information for each wireless signature information, for groups of wireless signature information, and/or the like.

In one embodiment, the request receiving module 206 receives a request to share the wireless signature information with a requesting party. The requesting party, for instance, may be first responders such as the police, ambulance, or firefighters; neighbors, private security companies, homeowners' associations, lawyers, private investigators, and/or the like. The request receiving module 206 may receive an electronic request over a data network from a requesting device. The request may include information about the requesting party, e.g., identification and contact information, information about the device that is used to make the request, e.g., identification information for the device, and/or the like, which may be used to verify that the requesting party is a party that is authorized to receive wireless signature information from the network-connected device, e.g., whether the user and/or device is on a pre-approved list for receiving wireless signature information.

In some embodiments, the request receiving module 206 may provide an interface for requesting parties to submit a request. For instance, a network-connected device may generate a web interface that is accessible using a web browser and where request information can be submitted such as one or more specific wireless signatures to search for, a timeframe for the wireless signature information, a reason for the request, and/or the like. Other interfaces may be provided including a mobile application, a gateway, and/or the like.

In one embodiment, the request that the request receiving module 206 receives includes a query for a specific wireless signature. For instance, a user or device may submit a query to check if the MAC address "AA:BB:CC:DD:EE:FF" has been detected by a network-connected device, e.g., a security system at a home or office. If so, the wireless signature information for the particular wireless signature may be shared with the requesting party, user, or device, assuming the requesting party is authorized to receive the wireless signature information.

In further embodiments, the request that the request receiving module 206 receives includes a timeframe for wireless signature data that is captured/recorded during the timeframe. For instance, the police may submit a request for wireless signature information for wireless signatures that are detected at a specific address between 8 pm and midnight on a particular day, or for every day during a week, or the like. The wireless signature information for the requested time frame may be shared with the requesting party, user, or device, assuming the requesting party is authorized to receive the wireless signature information.

In one embodiment, the request that the request receiving module 206 receives includes a reason for requesting the wireless signature information. The reason may include a description for the request such as "My home was broken into at 11:45 PM on Monday. Are there any unknown devices in the area at that time?" The request receiving module 206 may automatically process the request reason, using natural language processing or the like, to determine whether the reason is a predetermined reason for sharing the wireless signature data, e.g., whether the reason is a valid reason, is an urgent reason, or the like. To determine whether it is a predetermined reason for sharing the wireless signature information, the request receiving module 206 may compare the reason, or one or more keywords in the reason, to one or more predefined reasons or predefined keywords that are designated as valid reasons.

The sharing module 208, in one embodiment, is configured to share the wireless signature information with the requesting party from the network-connected device in response to determining that the requesting party is an authorized party for receiving the wireless signature information. The sharing module 208, for example, may send the wireless signature information as an attachment to an email address for the requesting party, as a text message sent to the phone number for the requesting party, as an instant message, as a push notification, and/or the like.

In one embodiment, the sharing module 208 prevents sharing wireless signature information for one or more known wireless signatures, e.g., wireless signatures for devices of family members, friends, relatives, neighbors, and/or others who are recognized or known. For instance, if a neighbor requests wireless signature information for a time frame when the neighbor's car was broken into, the sharing module 208 may remove wireless signature information that for the neighbor's devices and for the devices of the owner of the network-connected device that is being queried.

In one embodiment, the sharing module 208 does not share PII for the owner of the network-connected device and/or for the user of the detected device. However, in certain embodiments, the sharing module 208 may share the PII for the user of the detected device in response to a request from a legal authority such as the police, fire fighter, lawyer, or the like. In this manner, the PII of the owner of the network-connected device that captured the wireless signature information and the PII of the user of the detected device can be protected and only released if requested legally.

Figure 3:
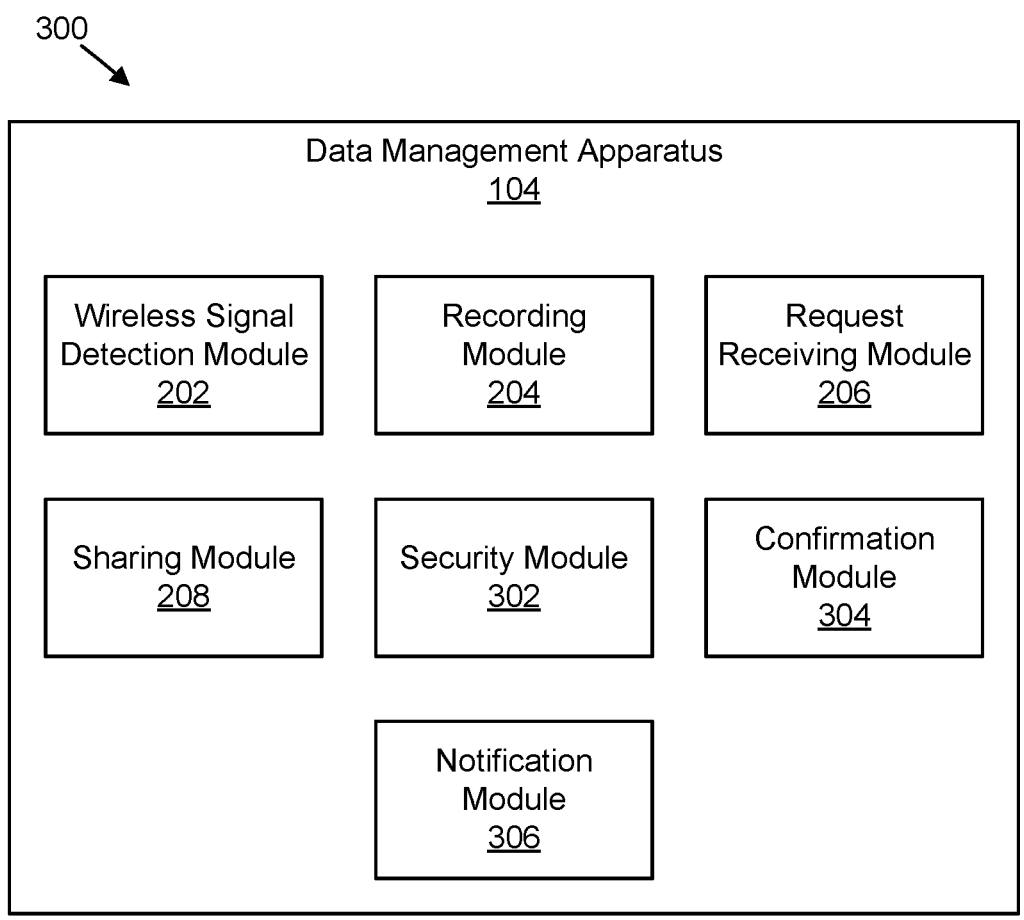
FIG. 3 is a schematic block diagram illustrating one embodiment of another apparatus for dynamically sharing wireless signature data.

FIG. 3 is a schematic block diagram illustrating one embodiment of another apparatus 300 for dynamically sharing wireless signature data. In one embodiment, the apparatus 300 includes an instance of a data management apparatus 302. The data management apparatus 104, in certain embodiments, includes one or more of a security module 302, a confirmation module 304, and a notification module 306, which are described in more detail below.

The security module 302, in one embodiment, is configured to detect illegal activity within a predetermined proximity of the network-connected device and automatically share wireless signature information for one or more wireless signatures that are detected within a timeframe of the detected criminal activity with a first responder system. The predetermined proximity may be a radial distance from the network-connected device, e.g., a mile, five miles, or the like, a number of blocks or streets from the network-connected device, a geo-fenced area, and/or the like.

For instance, a security module 302 for a security system may receive a notification, message, signal, or the like from a neighboring security system indicating a break-in or other illegal activity at the neighbor. In response to the notification, the security module 302 and/or the sharing module 208 may automatically, and on a continuous basis, send wireless signature information and or PII associated with the wireless signature information to a first responder system, e.g., a police dispatcher, to make them aware of people or devices that were detected a period of time (e.g., an hour) prior to the detected break-in, and may continuously send wireless signature information to the first responder as new wireless signatures are detected at the security system (or other devices communicatively coupled to the security system).

The security module 302 and/or the sharing module 208 may share wireless signature information for the time period of the illegal activity with other neighboring devices for other households, offices, or the like. In such an embodiment, the security module 302 and/or the sharing module 208 may only share wireless signature information for wireless signatures that are unknown to both the detecting device and the neighboring devices.

The confirmation module 304, in one embodiment, is configured to prompt a user associated with the network-connected device for confirmation to share the wireless signature information. In one embodiment, prior to the sharing module 208 sharing wireless signature information automatically or in response to a request, the confirmation module 304 presents a prompt to the user to confirm sharing the wireless signature information. The prompt may include a description of the wireless signature information that will be shared, information about the requesting party and/or the reason for the request, and/or the like.

The confirmation module 304 may present the prompt as a push notification, a text message, an email, a web page or other interface, and/or the like. If the user's declines to share the wireless signature information, the sharing module 208 does not share the wireless signature information with the requesting party and may notify the requesting party that the request has been denied. Otherwise, if the user confirms the request, the sharing module 208 shares the requested wireless signature information with the requesting party.

The notification module 306, in one embodiment, is configured to notify a user associated with the network-connected device that wireless signature information has been shared with one or more other devices. In one embodiment, if wireless signature information is automatically shared with a requesting party, or a with a pre-approved party that does not need to submit a request (e.g., the police), the notification module 306 sends a push notification, an email, a text message, an instant message, or the like to a user associated with the devices capturing the wireless signature information to notify them that the wireless signature information was shared or will be shared unless the user denies sharing the wireless signature information.

In one embodiment, the notification may include one or more of an indication of the wireless signature information that was/will be shared, an identifier for each device that the wireless signature information was/will be shared with, identification of the party that the wireless signature information was/will be shared with, a reason for sharing the wireless signature information, and/or the like.

Figure 4:
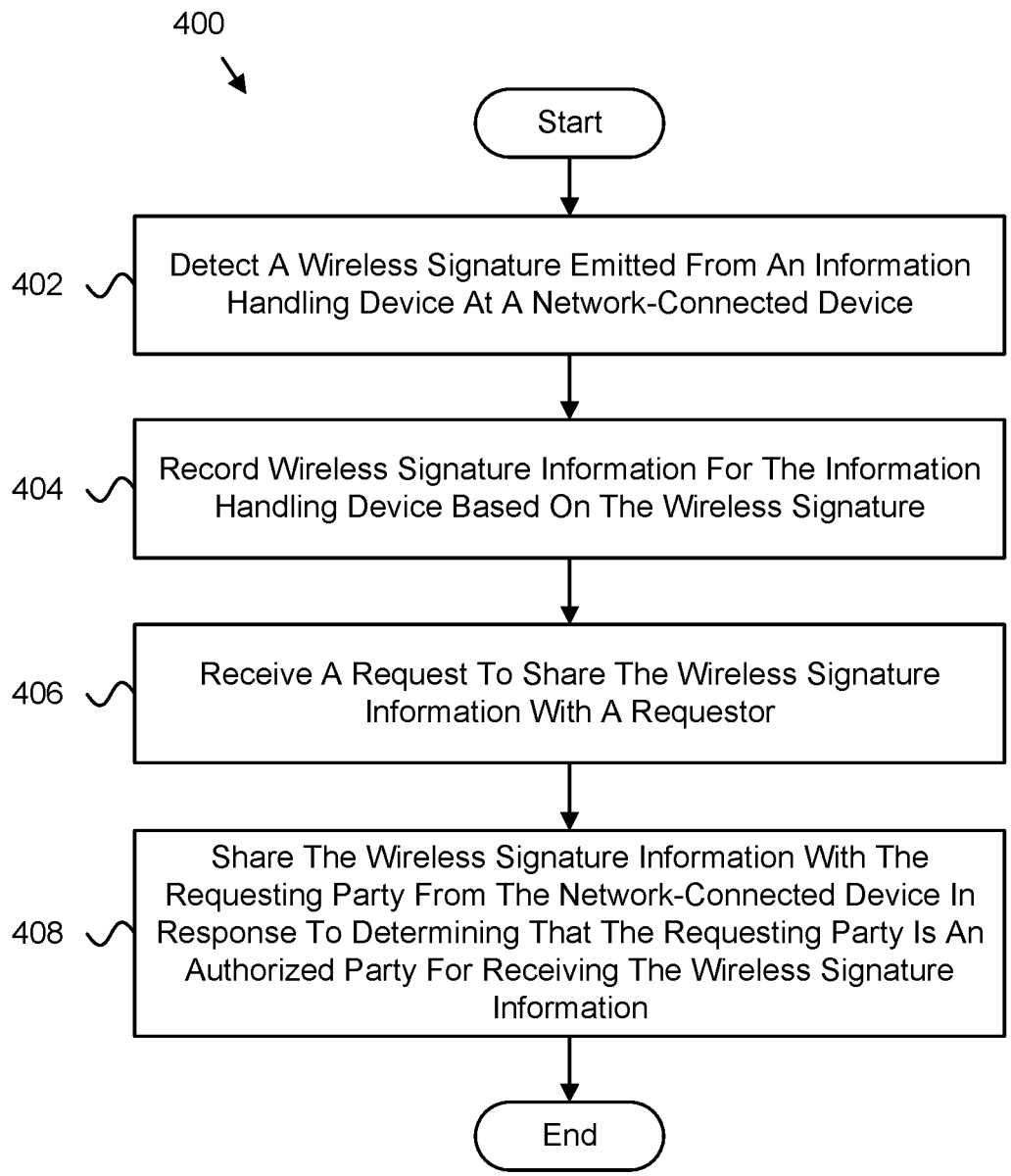
FIG. 4 is a schematic flow chart diagram illustrating one embodiment of a method for dynamically sharing wireless signature data.

FIG. 4 is a schematic flow chart diagram illustrating one embodiment of a method 400 for dynamically sharing wireless signature data. In one embodiment, the method 400 begins and detects 402 a wireless signature emitted from an information handling device at a network-connected device. In further embodiments, the method 400 records 404 wireless signature information for the information handling device based on the wireless signature.

In certain embodiments, the method 400 receives 406 a request to share the wireless signature information with a requesting party. In various embodiments, the method 400 shares 408 the wireless signature information with the requesting party from the network-connected device in response to determining that the requesting party is an authorized party for receiving the wireless signature information, and the method 400 ends. In one embodiment, the wireless signal detection module 202, the recording module 204, the request receiving module 206, and the sharing module 208 perform the various steps of the method 400.

Figure 5:
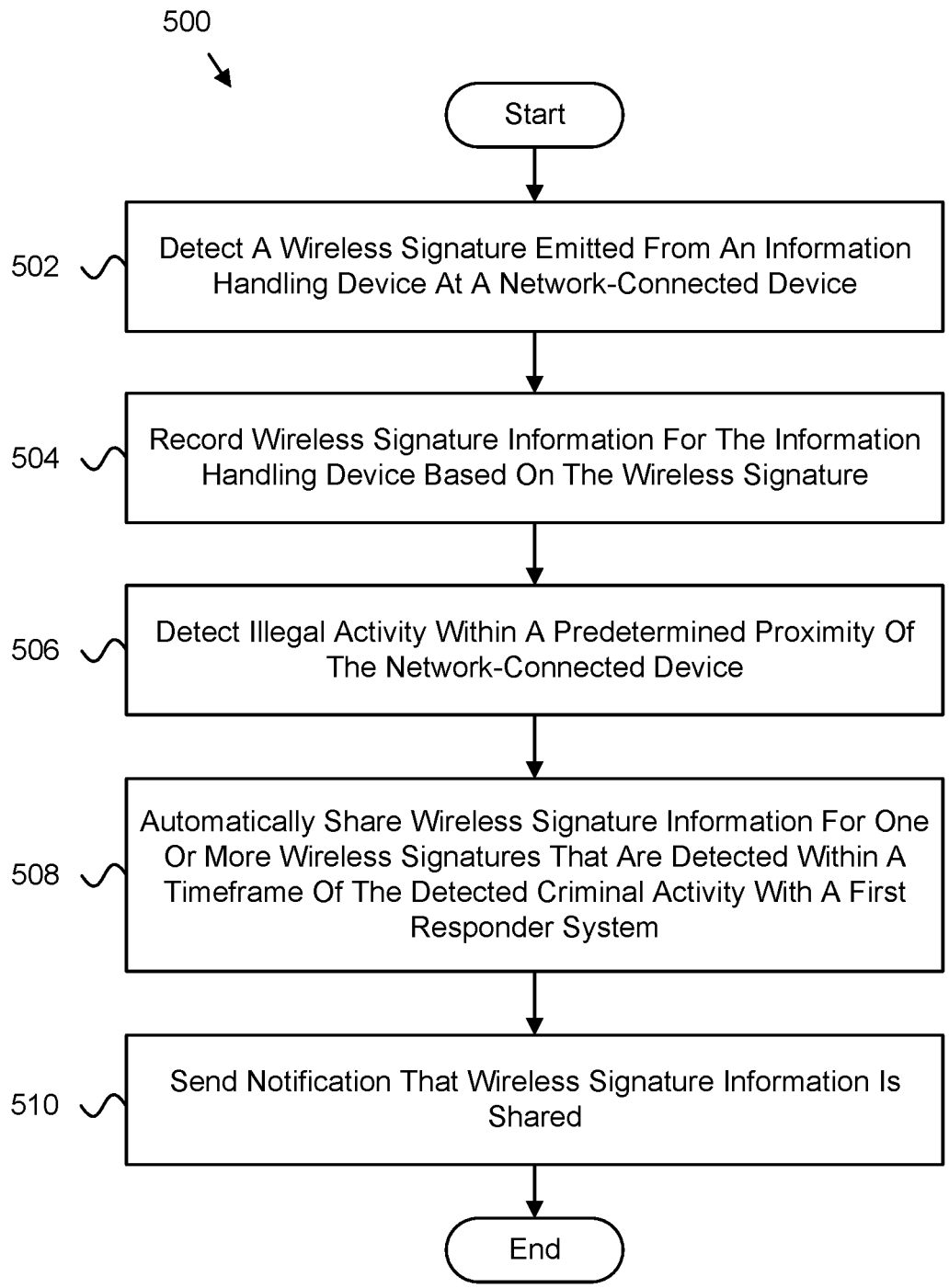
FIG. 5 is a schematic flow chart diagram illustrating one embodiment of another method for dynamically sharing wireless signature data.

FIG. 5 is a schematic flow chart diagram illustrating one embodiment of another method 500 for dynamically sharing wireless signature data. In one embodiment, the method 500 begins and detects 502 a wireless signature emitted from an information handling device at a network-connected device. In further embodiments, the method 500 records 504 wireless signature information for the information handling device based on the wireless signature.

In one embodiment, the method 500 detects 506 illegal activity within a predetermined proximity of the network-connected device. In some embodiments, the method 500 automatically shares 508 wireless signature information for one or more wireless signatures that are detected within a timeframe of the detected criminal activity with a first responder system. In certain embodiments, the method 500 sends 510 a notification to a user associated with the network-connected device that the wireless signature information is shared, and the method 500 ends. In one embodiment, the wireless signal detection module 202, the recording module 204, the sharing module 208, the security module 302, and the notification module 306 perform the various steps of the method 500.

Figure 6:
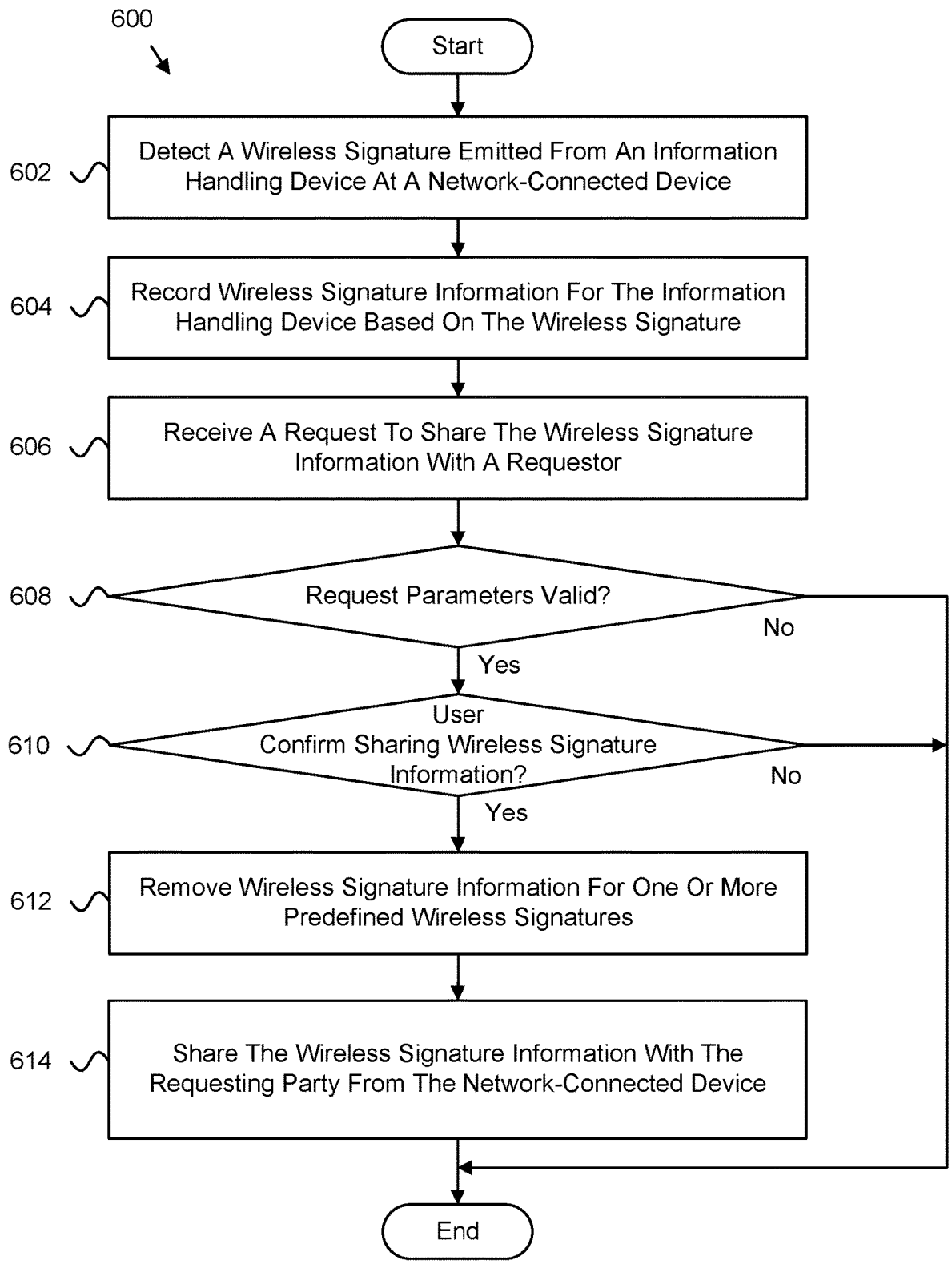
FIG. 6 is a schematic flow chart diagram illustrating one embodiment of another method for dynamically sharing wireless signature data.

FIG. 6 is a schematic flow chart diagram illustrating one embodiment of another method 600 for dynamically sharing wireless signature data. In one embodiment, the method 600 begins and detects 602 a wireless signature emitted from an information handling device at a network-connected device. In further embodiments, the method 600 records 604 wireless signature information for the information handling device based on the wireless signature. In certain embodiments, the method 600 receives 606 a request to share the wireless signature information with a requesting party.

In one embodiment, the method 600 determines 608 whether the request includes valid parameters such as whether the request is from an approved or authorized requesting party, whether the request includes a valid reason for sharing the wireless signature information, and/or the like. If not, the method 600 ends. Otherwise, the method 600 determines 610 whether a user associated with the network-connected device(s) that captured the wireless signature information has confirmed 610 sharing the requested wireless signature information. If not, the method 600 ends.

Otherwise, the method 600 removes 612 wireless signature information for one or more predefined wireless signatures, e.g., one or more wireless signatures that are known or otherwise designated as wireless signatures that should not be shared. In further embodiments, the method 600 shares 614 the wireless signature information with the requesting party from the network-connected device, and the method 600 ends. In one embodiment, the wireless signal detection module 202, the recording module 204, the request receiving module 206, the sharing module 208, and the confirmation module 304 perform the various steps of the method 600.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a memory that stores code, when executed, by the processor is configured to:
detect a wireless signature emitted from an information handling device at a network-connected device, the wireless signature being detected via a local wireless network including the network-connected device;
record wireless signature information for the information handling device based on the wireless signature and store the wireless signature information in the network-connected device;
receive a request to share the wireless signature information with a requesting party, wherein the request comprises a specific reason for requesting that the wireless signature be shared; and
share the wireless signature information via the wide area network with the requesting party from the network-connected device in response to:
determining that the requesting party is an authorized party for receiving the wireless signature information,
determining that the specific reason matches one of a plurality of predetermined particular valid reasons for sharing the wireless signature information, and
determining that the wireless signature information is associated with at least one of an unknown wireless signature and an unknown information handling device.

2. The apparatus of claim 1, wherein the code is executable by the processor to: detect illegal activity within a predetermined proximity of the network-connected device; and automatically share wireless signature information for one or more wireless signatures that are detected within a timeframe of the detected criminal activity with a first responder system.

3. The apparatus of claim 2, wherein the illegal activity is detected based on information received at a first security system from one or more second security systems communicatively coupled to the first security system over a data network.

4. The apparatus of claim 2, wherein the code is executable by the processor to share wireless signature information with one or more neighboring devices for one or more wireless signatures that are unknown to a sender and the one or more neighboring devices.

5. The apparatus of claim 1, wherein the code is executable by the processor to prevent sharing wireless signature information for one or more known wireless signatures.

6. The apparatus of claim 1, wherein the request includes a query for a specific wireless signature, the wireless signature information being shared with the requesting party in response to wireless signature information being recorded for the specific wireless signature.

7. The apparatus of claim 1, wherein the request includes a timeframe such that wireless signature information for one or more wireless signatures that are detected within the timeframe are shared with the requesting party.

8. The apparatus of claim 1, wherein the request includes a reason for requesting the wireless signature information, the code further executable by the processor to process the reason and determine whether the reason satisfies a predetermined reason for sharing the wireless signature information.

9. The apparatus of claim 1, wherein recorded wireless signature information for each detected wireless signature comprises permissions that define parameters for sharing the wireless signature information.

10. The apparatus of claim 1, wherein the wireless signature information comprises one or more of a device identifier for the information handling device emitting the wireless signature, a user identifier for the device, a signal strength of the detected wireless signal, and a location of the detected wireless signal.

11. The apparatus of claim 1, wherein the code is executable by the processor to prompt a user associated with the network-connected device for confirmation to share the wireless signature information.

12. The apparatus of claim 1, wherein the code is executable by the processor to notify a user associated with the network-connected device that wireless signature information has been shared with one or more other devices.

13. The apparatus of claim 12, wherein the notification comprises one or more of an indication of the wireless signature information that was shared, an identifier for each device that the wireless signature information was shared with, and a reason for sharing the wireless signature information.

14. A method, comprising:
detecting, by a processor, a wireless signature emitted from an information handling device at a network-connected device the wireless signature being detected via a local wireless network including the network-connected device;
recording wireless signature information for the information handling device based on the wireless signature and store the wireless signature information in the network-connected device;
receiving a request to share the wireless signature information with a requesting party, wherein the request comprises a specific reason for requesting that the wireless signature be shared; and
sharing the wireless signature information via the wide area network with the requesting party from the network-connected device in response to:
determining that the requesting party is an authorized party for receiving the wireless signature information,
determining that the specific reason matches one of a plurality of predetermined particular valid reasons for sharing the wireless signature information, and
determining that the wireless signature information is associated with at least one of an unknown wireless signature and an unknown information handling device.

15. The method of claim 14, further comprising: detecting illegal activity within a predetermined proximity of the network-connected device; and automatically sharing wireless signature information for one or more wireless signatures that are detected within a timeframe of the detected criminal activity with a first responder system.

16. The method of claim 14, further comprising sharing wireless signature information with one or more neighboring devices for one or more wireless signatures that are unknown to a sender and the one or more neighboring devices.

17. The method of claim 14, wherein the request includes a query for a specific wireless signature, the wireless signature information being shared with the requesting party in response to wireless signature information being recorded for the specific wireless signature.

18. The method of claim 14, further comprising prompting a user associated with the network-connected device for confirmation to share the wireless signature information.

19. The method of claim 14, further comprising notifying a user associated with the network-connected device that wireless signature information has been shared with one or more other devices.

20. A computer program product, comprising a non-transitory computer-readable storage medium including program instructions embodied therewith, the program instructions, when executed, by a processor to cause the processor to:
- detect a wireless signature emitted from an information handling device at a network-connected device, the wireless signature being detected via a local wireless network including the network-connected device;
- record wireless signature information for the information handling device based on the wireless signature and store the wireless signature information in the network-connected device;
- receive a request to share the wireless signature information with a requesting party, wherein the request comprises a specific reason for requesting that the wireless signature be shared; and
- share the wireless signature information via the wide area network with the requesting party from the network-connected device in response to:
- determining that the requesting party is an authorized party for receiving the wireless signature information,
- determining that the specific reason matches one of a plurality of predetermined particular valid reasons for sharing the wireless signature information, and
- determining that the wireless signature information is associated with at least one of an unknown wireless signature and an unknown information handling device.

* * * * *